Patented May 15, 1934

1,959,021

UNITED STATES PATENT OFFICE 1,959,021

METHOD OF MAKING RUBBER GOODS

Benton Dales, Fairlawn, Ohio, assignor, by mesne assignments, to American Anode Inc., Akron, Ohio, a corporation of Delaware No Drawing. Application August 16, 1928,
Serial No. 300,144

12 Claims. (Cl. 91—68)

This invention relates to the manufacture of rubber articles, and also of rubber-covered articles, and particularly to a method of utilizing aqueous dispersions of rubber directly in such manufacture.

In general, the invention consists in utilizing a solid or base member, which may be a part of the finished article or only a form upon which the article is to be made and which consists of or has been coated with a material substantially impermeable to water but more or less permeable to organic solvents. The base member is brought into contact with such an organic liquid, which is a coagulant for rubber or contains dissolved therein such a coagulant, and the liquid permitted to penetrate at least into the surface portions of the base member. The treated base member is now introduced into an aqueous dispersion of rubber, whereupon the coagulant diffuses into the dispersion and particles of the dispersion coagulate at the surface of the base member to form a permanent coating thereon or to produce an article which, after drying, may be removed in the manner of articles made on a mold.

Specifically, the base member may be of rubber or similar water impermeable material, or may be of other material having a coating of rubber or other water impermeable material. In the former case, the rubber base may be dipped directly into the coagulant liquid and then into the aqueous dispersion so as to provide the base with an added rubber layer. Or, the base member may be of metal, porcelain, glass, wood or other suitable solid, coated with rubber or similar water impermeable material. In the latter case the rubber or like coating may be applied by spraying or spreading with, or dipping in, an organic solution or an aqueous dispersion of the water impermeable material, or other means for securing the coating on the base member may be employed. In any case, the base member may be hollow and/or provided interiorly with means for heating and cooling, in a manner now common with dipping forms.

In one embodiment of my invention, a form, such as metal, porcelain or glass glove form, is immersed in an aqueous dispersion of rubber, which may or may not be especially concentrated or thickened by chemical or other means. The form is withdrawn carefully and carries with it a thin coating of the dispersion. The coated form is then dipped in a coagulant liquid for this dispersion. The coagulant liquid may consist of a liquid coagulant such as acetic acid, or may consist of an organic solvent carrying in solution a coagulant, such as a mixture of acetone and formic acid. The form is withdrawn from the coagulant liquid, and preferably any excess of the liquid removed by any suitable means, such as by drying or by whirling in the air to remove any drops of liquid thereon. The form is then again immersed into the aqueous dispersion of rubber.

On coming into contact with the rubber dispersion a second time, a very much heavier layer of material is deposited on the form than at the first dipping because of a diffusion of the coagulant from the first layer into the dispersion. The second layer is not only thicker but is also much more uniform, and especially at the corners or sharp edges, since the coagulant diffuses out approximately equally in all directions and sets or coagulates the layer, so that upon withdrawing the form from the aqueous dispersion, the surface tension does not draw the coating thin at the edges, as is the case in usual dipping processes.

Coatings of greater thickness may be obtained by alternately dipping the coated article in the coagulant liquid and in the aqueous dispersion, the cycle of operations being repeated as many times as may be necessary to build up a rubber coating of the desired thickness.

In another embodiment of my invention in which it is desired to coat an article permanently with rubber, as to protect metal objects from corrosion and abrasion, or wooden objects from absorption of liquids, etc., the article is first coated with a surface layer of some material which will insure adhesion between the article and the coating. In practice, I find that this may be accomplished by spreading or spraying with, or dipping in, either an organic solution of a rubber isomer or an aqueous dispersion thereof. The coated article thus formed constitutes a base member into the surface coating of which is absorbed a coagulant liquid, such as a solution of acetic acid in benzol. The benzol has the ability of readily penetrating the adhesive layer and carries with it the acetic acid, the latter being an effective coagulant for rubber in aqueous dispersion.

The article with its coating of the adhesive rubber isomer in which is absorbed the acetic acid solution is now dipped into (or spread or sprayed with) an aqueous dispersion of rubber, such as rubber latex. The acetic-acid solution diffuses into the dispersion and cause largely by coagulation a deposition of the solid constituents of the dispersion at the surface of the article.

The article, when the rubber coating has been dried and vulcanized, is provided with a firm, coherent, protective rubber coating.

Coatings of any thickness may be obtained by alternately dipping the coated article of the preceding paragraph first in the coagulant liquid, and then in the aqueous dispersion, the number of these alternate dippings being governed by the thickness desired. It may be found desirable when the coating is built up in several successive layers, to employ as the solvent for the acetic acid a substance such as acetone which does not appreciably swell rubber.

In a modification of the embodiment of my invention above described in which an article, and particularly a metal article, is to be permanently covered with rubber, I find that under certain circumstances it is advantageous to apply to the article first a coating of an adhesive capable of firmly bonding rubber to the article and then a coating of rubber thereon. The coagulant is then applied to the rubber layer instead of directly to the adhesive underneath.

Specifically, in rubber coating metal articles, I prefer to use a solution in an organic solvent of the rubber isomer prepared by the exothermal reaction of 7½ parts by weight of phenol sulfonic acid on 100 parts of rubber, the metal article being coated with this solution and the coating being permitted to dry. The isomer coated metal is then dipped in an aqueous dispersion of rubber to form thereon the coagulant absorbing coating. The steps of absorbing in the coating the coagulant liquid and then dipping in an aqueous dispersion are carried out in the manner hereinabove described to build up on the article a coating of adequate thickness, the coagulant preferably being a solution of formic acid in acetone.

The base member has been hereinabove described as consisting of, or provided with a coating of, a material substantially impermeable to water but more or less permeable to organic solvents. I have found that rubber and adhesive rubber derivatives are best adapted for the absorbent surface of the base member. Where a strong adhesion of the rubber coating to the base member is desired, I prefer to employ the thermoplastic rubber isomers prepared by the exothermal reaction of rubber and an isomerizing agent for rubber described and claimed in the United States Patent No. 1,605,180, of November 2, 1926. The invention is not, however, restricted to a base member of any particular materials or having a surface coating of any particular materials but only as to the materials having the properties herein specified.

The coagulant liquid may comprise other solvents than acetone, for example, alcohol, ether, benzene, gasoline, carbon tetrachloride and other so-called organic solvents are operable. Further, the coagulants may include in addition to formic and acetic acids, any coagulants for aqueous dispersions of rubber permeable in rubber or soluble in the solvent employed. For example, sulfuric and other mineral acids and salts of bivalent and trivalent metals, such as the salts of calcium, magnesium and aluminum may be employed.

The term "rubber" as herein employed is intended to include caoutchouc, balata, gutta percha and other similar caoutchouc substances, whether in the crude state or vulcanized, also reclaimed rubbers and synthetic rubbers, and the phrase "aqueous dispersions of rubber" is intended to include natural and artificial aqueous dispersions of the above indicated rubber substances and admixtures thereof with each other and/or with other materials, such as rubber substitutes, cellulosic compounds, natural and synthetic resins, compounding and vulcanizing agents, stabilizing agents and protective colloids, and/or substances normally having coagulating properties but added in amounts insufficient to produce coagulation. Furthermore the dispersions may have any desired degree of rubber concentration and/or any desired viscosity to meet the requirements for any particular article or product.

While the process above-described is particularly adapted for operations involving dipping, it is also possible to apply the coatings of coagulant liquid and rubber by spraying or spreading, or if desired by electrodeposition. Numerous other modifications and variations of my invention may be employed without departing from the principles thereof and I therefore do not intend to limit the claims hereof except as may be required by the prior art.

I claim:

1. The method of manufacturing rubber articles which comprises applying to the surface of a base member a substantially anhydrous liquid coagulant composition, and thereafter coating the treated surface with an aqueous dispersion of rubber.

2. The method of manufacturing rubber articles which comprises applying to the surface of a base member a solution of a coagulant in a substantially anhydrous volatile organic solvent, thereafter immersing the treated surface in an aqueous dispersion of rubber, and drying the coagulated rubber.

3. The method of manufacturing rubber articles which comprises applying to the surface of a base member alternately a solution of a coagulant in a substantially anhydrous volatile organic solvent which is miscible with water and an aqueous dispersion of rubber until a rubber layer of the desired thickness is formed, and drying the coagulated rubber.

4. The method of manufacturing rubber articles which comprises immersing a base member alternately in a solution of a coagulant in a substantially anhyrous volatile organic solvent which is miscible with water and in a vulcanizable aqueous dispersion of rubber until a rubber layer of the desired thickness is formed, and drying and vulcanizing the coagulated rubber.

5. The method of manufacturing rubber coated articles which comprises coating with an aqueous dispersion of rubber a non-porous base member provided with a surface layer comprising an adhesive and a coagulant, leaving the dispersion in contact with the base member until an adherent deposit of rubber of substantial thickness is formed by the diffusion of the coagulant into the dispersion.

6. The method of manufacturing rubber coated articles which comprises providing a non-porous base member with an adhesive surface layer soluble in organic solvents but insoluble in water, and capable of uniting rubber to non-porous surfaces, absorbing in the adhesive a solution of a coagulant, immersing the treated surface in an aqueous dispersion of rubber, and drying the coagulated rubber.

7. The method of manufacturing rubber coated articles which comprises immersing in an aqueous dispersion of rubber, a non-porous metallic base member provided with a surface layer comprising an organic water-insoluble adhesive capable of uniting metal to rubber and a water-soluble coagulant, and drying and vulcanizing the coagulated rubber on the base member.

8. The method of manufacturing rubber coated articles which comprises coating a base member with a layer of an adhesive, thermoplastic, artificial rubber isomer, absorbing in the adhesive layer a solution of a coagulant in an organic solvent, immersing the treated surface in an aqueous dispersion of rubber, and drying and vulcanizing the coagulated rubber on the base member.

9. The method of manufacturing rubber coated articles which comprises coating a base member with a layer of an adhesive, thermoplastic, artificial rubber isomer, immersing the treated surface successively in a solution of a coagulant in a substantially anhydrous organic solvent and in a vulcanizable aqueous dispersion of rubber, and drying and vulcanizing the coagulated rubber.

10. The method of manufacturing rubber coated articles which comprises coating a base member with a layer of an adhesive, thermoplastic, artificial rubber isomer, immersing the treated surface alternately in a solution of a coagulant in a substantially anhydrous organic solvent and in a vulcanizable aqueous dispersion of rubber until a rubber layer of the desired thickness is formed, and drying and vulcanizing the coagulated rubber on the base member.

11. The method of manufacturing rubber coated articles which comprises providing a non-porous base member with a surface layer comprising a coagulant and a water-insoluble substance adapted to adhere rubber to surfaces to which rubber alone will not adhere, and immersing the treated base member in an aqueous dispersion of rubber.

12. The method of manufacturing rubber coated articles which comprises coating a non-porous base member with a layer of a water-insoluble composition adapted to adhere rubber to surfaces to which rubber alone will not adhere, absorbing a coagulant solution in the said composition, and immersing the treated base member in an aqueous dispersion of rubber.

BENTON DALES.